(12) United States Patent
Garotte et al.

(10) Patent No.: US 7,594,634 B2
(45) Date of Patent: Sep. 29, 2009

(54) RETRACTABLE DEVICE FOR ENABLING A MOTOR VEHICLE SEAT TO SLIDE

(75) Inventors: Gérald Garotte, Echalou (FR); Fabrice Petit, Flers (FR)

(73) Assignee: Faurecia Sieges d'Automobile, Nanterre (FR)

( * ) Notice: Subject to any disclaimer, the term of this patent is extended or adjusted under 35 U.S.C. 154(b) by 627 days.

(21) Appl. No.: 11/384,904

(22) Filed: Mar. 20, 2006

(65) Prior Publication Data

US 2006/0214481 A1 Sep. 28, 2006

(30) Foreign Application Priority Data

Mar. 23, 2005 (FR) .................................. 05 02893

(51) Int. Cl.
*F16M 13/00* (2006.01)
(52) U.S. Cl. ..................................... 248/429
(58) Field of Classification Search ................. 248/424, 248/429; 297/341, 344.4
See application file for complete search history.

(56) References Cited

U.S. PATENT DOCUMENTS

| 4,648,657 A | 3/1987 | Cox et al. | |
|---|---|---|---|
| 4,949,932 A | 8/1990 | Terai | |
| 5,275,370 A | 1/1994 | Terai | |
| 5,775,662 A | 7/1998 | Hoshihara et al. | |
| 6,089,521 A * | 7/2000 | Tarusawa et al. | 248/430 |
| 6,439,531 B1 * | 8/2002 | Severini et al. | 248/423 |
| 6,772,985 B2 * | 8/2004 | Lee | 248/424 |
| 7,165,753 B2 * | 1/2007 | Oh | 248/429 |
| 7,293,752 B2 * | 11/2007 | McCulloch et al. | 248/429 |
| 2004/0232750 A1 | 11/2004 | Rohee et al. | |

FOREIGN PATENT DOCUMENTS

| EP | 0 411 842 A2 | 2/1991 |
|---|---|---|
| EP | 0 878 342 A1 | 11/1998 |
| EP | 0 943 484 A2 | 9/1999 |

OTHER PUBLICATIONS

French Preliminary Search Report FR 0502893; report dated Nov. 17, 2005.

* cited by examiner

*Primary Examiner*—Gwendolyn Baxter
(74) *Attorney, Agent, or Firm*—Miller, Matthias & Hull

(57) ABSTRACT

A device is for enabling a motor vehicle seat to slide. The device includes a runner, locking device, control support, control rod, and torsion spring. The locking device locks the runner having an active state and an inactive state. The control support is mounted to pivot on the moving rail between an active position in which it constrains the locking device to be in its active state and a rest position in which it allows the locking device to return to its active state. The control rod is mounted to pivot on the control support between an in-use position and a retracted position. The torsion spring tends to bring the control rod into the in-use position and tends to bring the control support into the rest position.

5 Claims, 2 Drawing Sheets

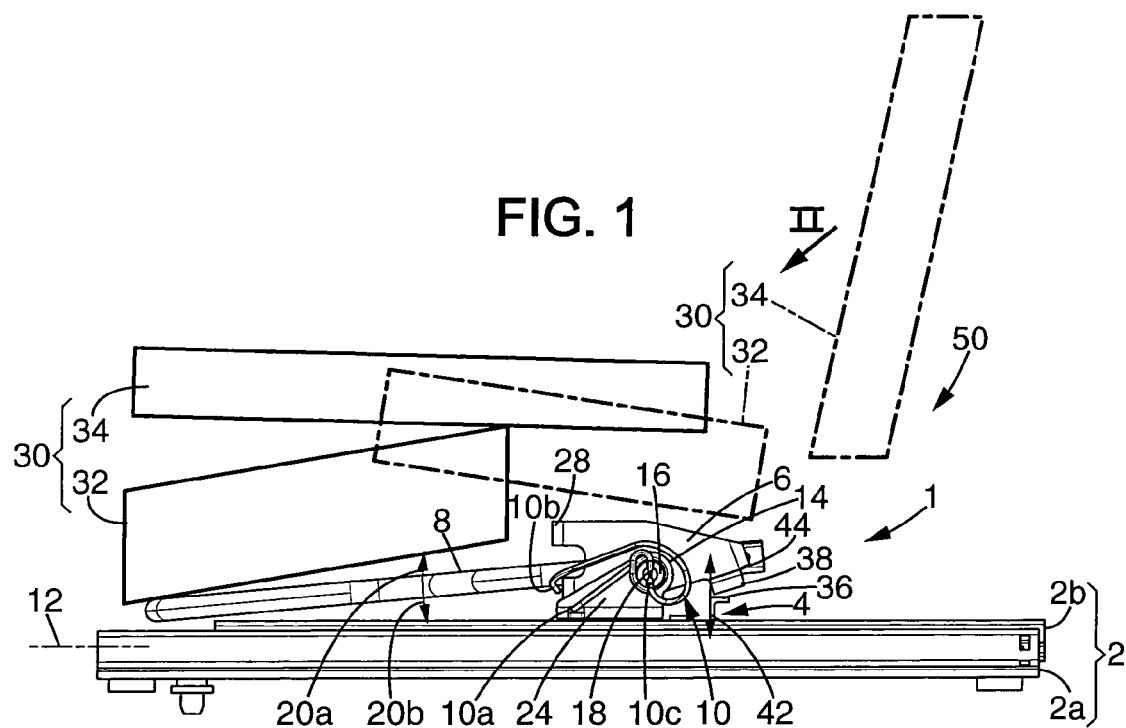
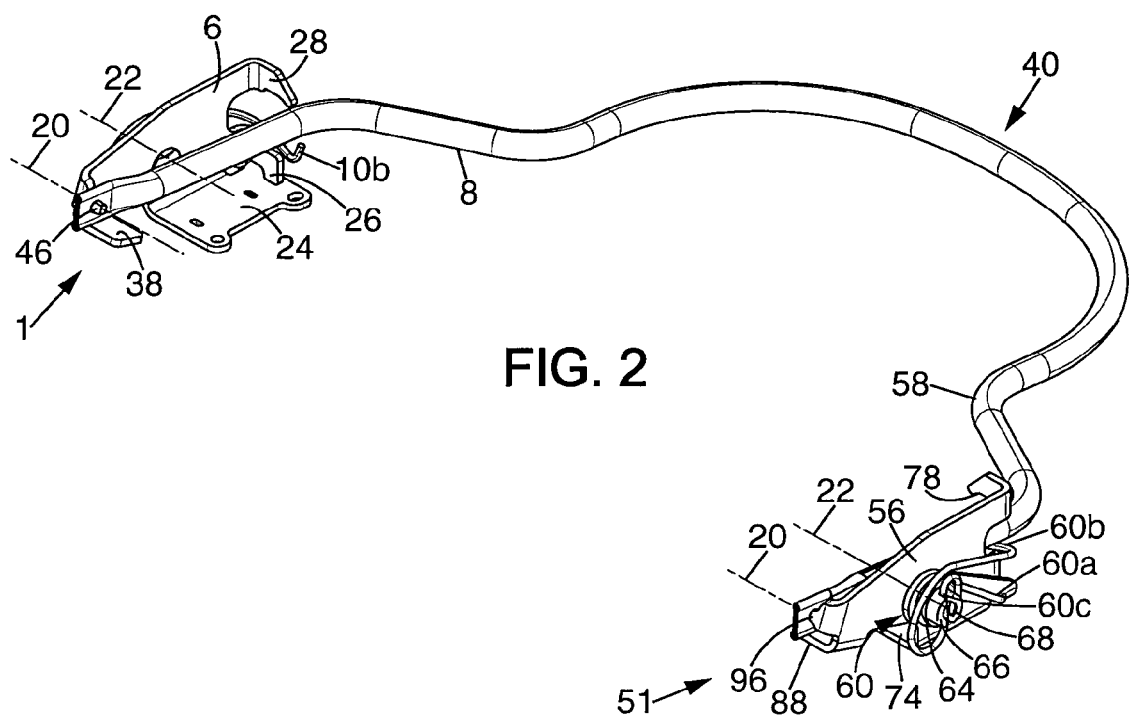

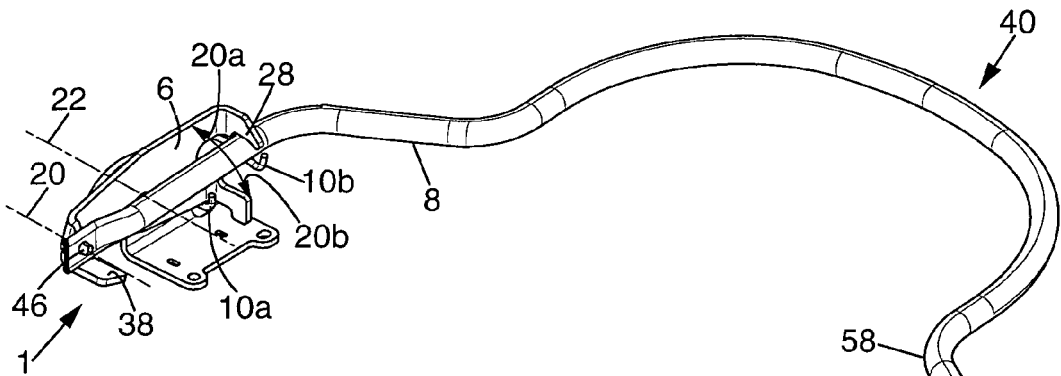
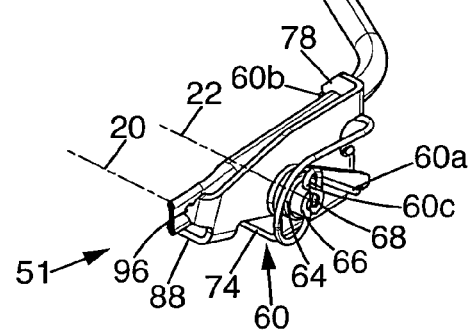
FIG. 3
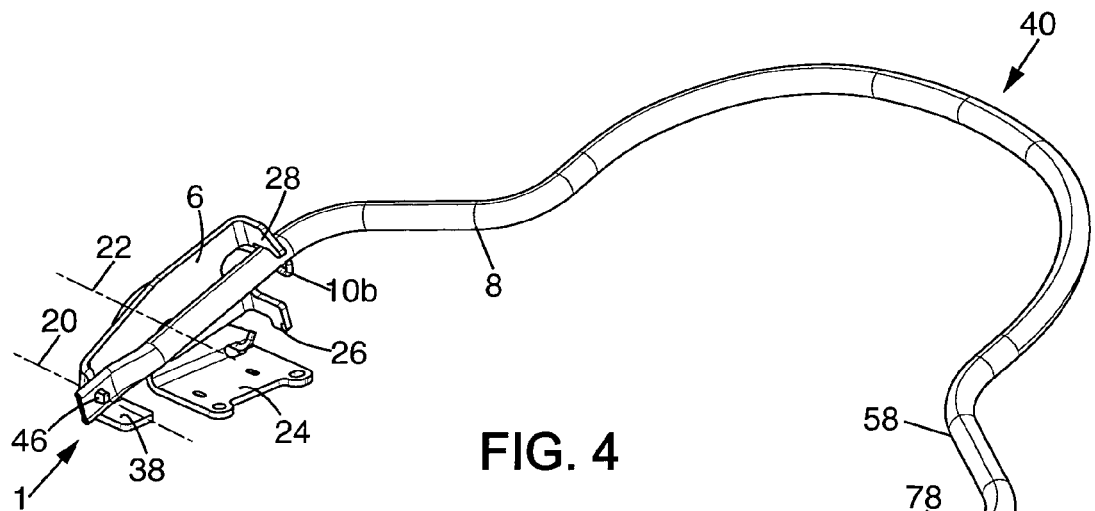
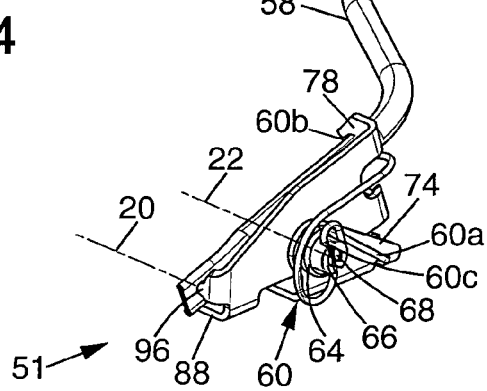
FIG. 4

RETRACTABLE DEVICE FOR ENABLING A MOTOR VEHICLE SEAT TO SLIDE

FIELD OF THE DISCLOSURE

The invention relates to a device for controlling the unlocking of a motor vehicle seat runner.

More precisely, it aims to make a seat more compact when in a folded-away position while it is not being used.

SUMMARY OF THE DISCLOSURE

In accordance with the invention, the device comprises:

a runner comprising a stationary rail designed to be fastened to the structure of the vehicle and a moving rail mounted to slide relative to the stationary rail;

a locking device having an active state in which it holds the moving rail stationary relative to the stationary rail and an inactive state in which it allows the moving rail to slide relative to the stationary rail;

a control support mounted to pivot on the moving rail between an active position in which it constrains the locking device to be in its inactive state and a rest position in which it allows the locking device to return to its active state;

a control rod mounted to pivot on the control support between an in-use position and a retracted position, the control rod pivoting in an actuation direction from its in-use position causing the control support to pivot towards its active position, and the control rod pivoting in a retraction direction opposite from the actuation direction allowing the control support to return to its rest position, and causing the control rod to move from its in-use position towards its retracted position; and a torsion spring having a first end coupled to the moving rail, a second end coupled to the control rod, and an intermediate portion coupled to the control support, said spring tending to bring the control rod into the in-use position and tending to bring the control support into the rest position.

Thus, the control rod can easily be brought against the floor of the vehicle in the retracted position, so as to improve the compactness of the seat while it is not being used, while also making it easy to take hold of the control rod by means of the spring which urges the control rod away from the floor to bring it into its in-use position. In addition, a single spring urges the control rod into the in-use position and urges the control support into the rest position, thereby reducing the cost of the device.

According to another characteristic of the invention, the control support has a pin mounted to pivot in a bore integral with the moving rail and said pin of the control support is provided with a slot receiving the intermediate portion of the torsion spring.

Thus, it is easy to mount the intermediate portion of the torsion spring on the control support.

According to yet another characteristic of the invention, the control rod is pivotally mounted on the control support to pivot about a first pivot axis, and the control support is pivotally mounted on the moving rail to pivot about a second pivot axis, the first pivot axis and the second pivot axis being mutually parallel and spaced apart.

Thus, it is possible to adjust the torque exerted by the spring on the control rod, and in particular to increase it without having to increase the stiffness of the spring.

According to another advantageous characteristic of the invention, the pivoting of the control support under the action of the torsion spring is stopped in the rest position of the control support by a first abutment integral with the control support, and the pivoting of the control rod under the action of the torsion spring is stopped in the in-use position of the control rod by a second abutment integral with the control support.

Thus, when the seat is not folded away and when the user is not exerting any force on the control rod, the position of said control rod is defined precisely.

BRIEF DESCRIPTION OF THE DRAWINGS

Other features and advantages of the present invention appear from the following description of non-limiting embodiments given with reference to the accompanying drawings, in which:

FIG. 1 is a perspective view of a vehicle seat constructed in accordance with the teachings of the disclosure;

FIG. 2 is a perspective view of a control bar of the vehicle seat and shown in a first position;

FIG. 3 is a perspective view of the control bar shown in a second position; and

FIG. 4 is a perspective view of the control bar shown in a third position

DETAILED DESCRIPTION OF THE DISCLOSURE

The figures show an assembly 50 comprising two devices 1, 51 designed to enable a motor vehicle seat 30 to slide relative to the structure of the vehicle. The devices 1, 51 are disposed on either side of the seat 30. Each device 1, 51 essentially comprises a runner 2, a locking device 4 designed to hold the runner 2 stationary, a control support 6, 56 designed to actuate the locking device 4, a control rod 8, 58 acting on the control support 6, 56, and a torsion spring 10, 60 acting on the control support 6, 56 and on the control rod 8, 58.

The runner 2 comprises a stationary rail 2a designed to be fastened to the structure of the vehicle and a moving rail 2b mounted to slide relative to the stationary rail along a sliding axis 12 A base support 24 is fastened to the moving rail 2b and is provided with a bore 14, 64

The locking device 4 is provided with teeth that co-operate with notches provided in the stationary rail 2a so as to hold the moving rail 2b stationary relative to the stationary rail 2a when the locking device is in an active state. When the locking device 4 is in an inactive state, the teeth of the locking device 4 are spaced apart from the notches in the stationary rail 2a, thereby allowing the moving rail 2b to slide relative to the stationary rail 2a The locking device 4 goes from its active state to its inactive state by moving in an unlocking direction 42 under the action of a tab 38, 88 provided on the control support 6 coming into abutment against a tongue 36 provided on the locking device 4. The locking device 4 goes from its inactive state to its active state by moving in a locking direction 44 which is opposite from the locking direction 42 under the action of a return spring.

The control support 6, 56 or "pallet" is mounted to pivot on the base support 24, 74 between an active position shown in FIG. 4 and in which the pallet 6, 56 presses on the tongue 36 of the locking device 4 via its tab 38, thereby bringing the locking device 4 into its inactive state, and a test position shown in FIGS. 1 to 3 in which the pallet 6, 56 allows the locking device 4 to return to its active state. The pallet 6, 56 has a pin 16 that is inserted into a bore 14 for guiding the pallet 6, 56 in pivoting about a pallet pivot axis 22 between its active position and its rest position. Between the pallet 6, 56 and the base support 24, the torsion spring 10, 60 exerts torque tending to return the pallet 6, 56 towards its test position. The pallet 6, 56 has an abutment 26 coming into contact with the base support 24, 74 when the pallet 6, 56 is in its rest position.

The control rod 8, 58 is mounted to pivot on the pallet 6, 56 between an in-use position shown in FIGS. 3 and 4 and a retracted position shown in FIGS. 1 and 2. The control rod 8, 58 pivots around a pivot axis 20 about a stud 46, 96 that is integral with the pallet 6, 56 that holds the control rod 8, 58. The control rod 8, 58 pivoting in an actuation direction 20a from its in-use position causes the pallet 6, 56 to pivot towards its active position, whereas the control rod 8, 58 pivoting in a retraction direction 20b opposite to the actuation direction 20a allows the pallet 6, 56 to return to the rest position. When the pallet 6, 56 is in its rest position, when the control rod 8, 58 is in its in-use position, and when it is desired for the seat 20 to be folded away into a retracted position, as shown in FIG. 1, the seat proper 32 of the seat 30 presses on the control rod 8, 58 in the retraction direction 20b and brings the control rod 8 into its retracted position in which it is substantially in contact with the structure of the vehicle. When the seat 30 is deployed, by raising the seat back 34 and the seat proper 32, the control rod 8, 58 pivots about the pivot axis 20 relative to the pallet 6, 56 under the action of the spring 10 until it comes into contact with the abutment 28 provided on the pallet 6.

The torsion spring 10, 60 has a first end 10a, 60a coupled to the base support 24, a second end 10b, 60b coupled to the control rod 8, 58 and an intermediate portion 10c, 60c that is inserted into a slot 18, 68 provided in the pin 16, 66 of the pallet 6, 56. The torsion spring 10, 60 thus exerts a pressure tending firstly to bring the control rod 8, 58 into the in-use position and secondly to bring the pallet 6, 56 into the rest position.

The pivot axis 20 about which the control rod 8, 58 pivots relative to the pallet 6, 56 and the pivot axis 22 about which the pallet 6, 56 pivots relative to the base support 24, 74 are mutually parallel, perpendicular to the sliding axis 12, and spaced apart from each other.

The control rods 8, 58 are united in one piece forming a common control bar 40 making it possible to control both of the devices 1, 51 simultaneously.

What is claimed is:

1. A device for enabling a motor vehicle seat to slide, said device comprising:
    a runner comprising a stationary rail designed to be fastened to the structure of the vehicle and a moving rail mounted to slide relative to the stationary rail;
    a locking device mounted on the moving rail and having an active state in which the locking device holds the moving rail stationary relative to the stationary rail and an inactive state in which the locking device allows the moving rail to slide relative to the stationary rail;
    a control support mounted to pivot on the moving rail between an active position in which the control support constrains the locking device to be in the inactive state and a rest position in which the control support allows the locking device to return to the active state;
    a control rod mounted to pivot on the control support between an in-use position and a retracted position, the control rod pivoting in an actuation direction from the in-use position causing the control support to pivot towards the active position, and the control rod pivoting in a retraction direction opposite from the actuation direction allowing the control support to return to the rest position, and causing the control rod to move from the in-use position towards the retracted position; and
    a torsion spring having a first end coupled to the moving rail, a second end coupled to the control rod, and an intermediate portion coupled to the control support, said spring tending to bring the control rod into the in-use position and tending to bring the control support into the rest position.

2. A device according to claim 1, wherein the control support has a pin mounted to pivot in a bore integral with the moving rail and said pin of the control support is provided with a slot receiving the intermediate portion of the torsion spring.

3. A device according to claim 1, wherein the control rod is pivotally mounted on the control support to pivot about a first pivot axis, and the control support is pivotally mounted on the moving rail to pivot about a second pivot axis, the first pivot axis and the second pivot axis being mutually parallel and spaced apart.

4. A device according to claim 1, wherein, the pivoting of the control support under the action of the torsion spring is stopped in the rest position of the control support by a first abutment integral with the control support, and the pivoting of the control rod under the action of the torsion spring is stopped in the in-use position of the control rod by a second abutment integral with the control support.

5. An assembly comprising two devices according to claim 1, wherein two control rods are united in one piece forming a control bar.

* * * * *